US006656395B2

(12) United States Patent
Menzel

(10) Patent No.: US 6,656,395 B2
(45) Date of Patent: Dec. 2, 2003

(54) PROCESS FOR DETERMINING PRESS PARAMETERS FOR PRESSING COMPLEX STRUCTURED MATERIALS

(75) Inventor: Roland Menzel, Kochel am See (DE)

(73) Assignee: Dorst Maschinen-und Analagenbau GmbH & Co. (DE)

(*) Notice: Subject to any disclaimer, the term of this patent is extended or adjusted under 35 U.S.C. 154(b) by 0 days.

(21) Appl. No.: 09/982,505

(22) Filed: Oct. 16, 2001

(65) Prior Publication Data

US 2003/0141619 A1 Jul. 31, 2003

(30) Foreign Application Priority Data

Oct. 16, 2000 (DE) ........................................ 100 51 236

(51) Int. Cl.[7] .......................... B29B 11/00; B29B 13/00

(52) U.S. Cl. ..................... 264/40.1; 264/40.4; 264/109; 419/66

(58) Field of Search .............................. 264/40.1–40.7, 264/109–128

(56) References Cited

U.S. PATENT DOCUMENTS 4,770,826 A * 9/1988 Vanvoren .................. 264/40.4
4,849,142 A * 7/1989 Panda et al. ............... 264/40.6
5,043,111 A 8/1991 Hinzmann et al.
5,288,440 A 2/1994 Sirasaki et al.
5,476,631 A 12/1995 Brown et al.

FOREIGN PATENT DOCUMENTS

| | | |
|---|---|---|
| DE | 29 51 716 | 7/1981 |
| DE | 40 09 609 | 10/1990 |
| DE | 39 19 821 | 12/1990 |
| DE | 42 09 767 | 5/1993 |
| EP | 0 490 148 A2 | 6/1992 |
| JP | 2000042793 | 2/2000 |

* cited by examiner

*Primary Examiner*—Stephen J. Lechert, Jr.
(74) *Attorney, Agent, or Firm*—Knobbe Martens Olson & Bear LLP

(57) ABSTRACT

The invention relates to a process for determining pressing parameters for the pressing of compacts, whereby in one step a test compact is brought to the required density in order to achieve the nominal pressing force, and in order that consequently the machine is in a balanced deflected condition with regard to this nominal pressing force. In next step, in case a nominal height ($hsi,_{Nominal}$) deviates from a height ($hsi,_{Measure}$) measured on the test compact, there will be determined for the next pressing operation a required height ($H_{PowderNew}$) of the material to be pressed in the pressing mould.

4 Claims, 2 Drawing Sheets

PROCESS FOR DETERMINING PRESS PARAMETERS FOR PRESSING COMPLEX STRUCTURED MATERIALS

FIELD OF THE INVENTION

The invention relates to a process for determining of pressing parameters for pressing of compacts of complex shape and to a device for carrying out such a process.

BACKGROUND OF THE INVENTION

Generally the condition of a part pressed from basic powder materials and consisting of one or more segments is defined by specifying the dimensions and densities of individual segments of said part. A pressed part as shown in FIG. 1, in the following also called compact, consists for example of three segments, each comprising a segment height hsi with i=1, 2 or 3, important in the course of a powder pressing process, as well as a segment density ρi of each segment. For the compact shown in FIG. 1, not all three segments start on the same basic level, so that in corresponding calculations there have to be taken into consideration also the distances x1 or x3 from a support surface and a basic level, respectively. To simplify the principles explained below, however, there will be regarded in the following a compact, on which all three segments S1, S2 or S3 are extending from a basic level upwards, as this can also be seen in FIG. 2A.

As can be seen in FIG. 2B, an example of a pressing device for pressing basic powder material to said compacts 9 consists in particular of a punch guiding device 1, in which in particular a main punch 2, in the following also referred to as upper ram, is guided in upward and downward direction. On the lower side of the upper ram 2 there are fixed pistons 3, 4 and 5 serving for actuation of individual punches, in the following also referred to as segment punches 6, 7 or 8. The segment punches 6, 7 and 8, can be moved in upward and downward direction relative to the main punch 2 by means of the pistons 3, 4 or 5. The segment punches 6, 7 and 8 are guided in a pressing mould, which here, for the purpose of simplified representation in the drawing, is assumed as identical to the punch guiding device 1. The pressing mould serves for being filled with a basic material in the form of powder or granulate to be pressed, and it ends with a bottom 10 at its lower end. On normal presses, however, there is usually provided instead of such a bottom 10 a comparable arrangement of punches, through which there can be exerted a pressing force from below in direction towards the pressing mould by means of a main punch and/or a plurality of individual segment punches. In the position as shown in FIG. 2B, the arrangement is in pressing position, with the main punch 2 and the segment punches 6, 7 and 8 in lowered position. Hereby the compact 9 is given the shape of the compact shown in FIG. 2A.

In order to achieve in the compact 9 the required segment densities ρ1, ρ2 and ρ3 of the individual segments S1, S2 and S3, respectively, it is necessary before the pressing operation to fill into the respective segments S1, S2 and S3 a considerably larger volume of powder than the volume in pressed condition. Normally the ratio of filling volume to pressed volume for basic powder materials is in the range between 1.8 and 2.3. Having filled in the basic powder material, a pressing force is exerted onto the upper ram 2 by a correspondingly designed pressing device for compacting the basic powder material. Forming of the compact 9 is effected by the segment punches 6, 7 and 8 which are movable independently relative to the upper ram 2 and are moving relative to the main pressing movement of the upper ram or main punch 2.

In order to be able to achieve accurate densities and heights of the individual segments S1, S2 and S3 of the compact 9, the main punch 2 and the segment punches 6, 7 and 8 are provided with distance traveling measuring systems 11–14 measuring the position of the upper ram 2 and of the punches 6–8, respectively. A problem in such pressing devices is the fact that such travel measuring systems 11–14 can not be fixed directly to the platen ends and punch ends, respectively, but are arranged at a more or less long distance at the beginning of the platen and on the upper side of the punches 2, 6–8; respectively.

The arrangement of the travel measuring systems does not have any effect on pressing operations later, but this arrangement does cause problems with respect to the determination of the required pressing parameters. Due to the high pressing pressures applied for pressing the basic powder materials, the individual main punches and segment punches 2, 6–8 will be compressed, too, during pressing. The usual balanced deflection under load of these components of a press is in the range of mm, whereas the accuracy requirements to the compacts are in the range of 0.01 mm.

The usual proceeding for setting of height and density values of the individual segments S1, S2, S3 of a compact 9, comprises a plurality of iterative approximating pressing tests, as a rule considerably more than 15 tests. In one or more first pressing tests, there is initially produced a compact 9 with a density which allows to touch and measure the compact 9. Subsequent it is attempted by iterative pressing tests to set the required height of the parts hs1, hs2 and hs3. Having achieved the recuired heights of the part, the pressing position necessary or this, or pressing height, is defined and set by positive stops for example. Having set or run-in the required heights of the parts hs1–hs3, the density of the part is optimized by usually a plurality of further iterative pressing tests. By adding basic powder material to or taking it away from the respective segment, the density there can be increased or reduced.

If now, for example, the density in segment hs1 is increased by filling in more powder, the corresponding platen or the corresponding segment punch 6 will deflect more during pressing due to the increased pressing force. Consequently the local height of the part hs1 of the segment S1 will change. In addition, the whole pressing device, due to the difference in pressing force, will deflect in a different manner, and this will be transferred also to the segment heights hs2, hs3 of the segments S2 and S3, respectively, and to their densities ρ2 respectively ρ3. Consequently also the values of the segments S2 and S3, which are not really affected, have to be newly set in corresponding manner, if parameters have to be changed in the range of segment S1. In other words, due to corresponding interaction, each change of position and/or density in a segment Si will result in necessary changes of the parameters of the remaining segments Si.

To illustrate this, there are shown in FIG. 2B a height $h_{OB}$ from a basic level up to the travel measuring system 11 of the main punch 2, which allows to comprehend the movement of the main punch 2 in upward or downward direction. As explained, the problem is the section of the main punch 2, which in upward and in downward direction is between the travel measuring system 11 and the lower edge of the main punch 2, because this section of the main punch 2 will be compressed in a different way, when applying a first pressing pressure than when applying a different second pressing pressure. The same thing applies to the measuring sections of the individual platens or the arrangements of pistons 3, 4, 5 with segment punches 6, 7 or 8, where the measuring sections h1, h2 or h3 measure always only the distance between the upper edge of a piston and the corresponding travel measuring systems 12–14, but do not measure the differently strong deformations of the sections between the travel measuring systems 12–14 and the corresponding lower edges of the segment punches 6–8, which are varying according to the pressing pressure. These sections, which can not be measured unequivocally with respect to compression, are shown in FIG. 2B by spring symbols $C_{ob}$, c1–c3.

SUMMARY OF THE INVENTION

In one embodiment of a process for determining pressing parameters for the pressing of compacts of complex shape, the process includes determining a density of a first compact having a first height, and setting a predetermined height of the first compact if the first compact has a predetermined nominal density. The compacts are in certain embodiments powder metallurgical or ceramic compacts.

In one embodiment, an automated device for carrying out the process includes a pressing device having a plurality of pressing punches configured to be movable forward and backward in a pressing direction, travel measuring devices configured to measure movements of the pressing punches, a measuring device configured to determine parameters of the compact to determine at least one of a density and a height of a compact, and a calculation device. The calculation device is configured to calculate a filling height for pressing material for a pressing test, whereby the pressing test includes determining a density of a first compact having a first height, and setting a predetermined height of the first compact if the first compact has a predetermined nominal density.

The object of the invention is to propose a process for determining the pressing parameters for pressing compacts of complex shape, in which the number of pressing tests is reduced.

This object is solved by a process with the features of claim 1 or 2, for determining pressing parameters for the pressing of compacts of complex shape, in particular of powder metallurgical or ceramic compacts. An automated device with the features set out in claim 6 allows in an advantageous way the automatic execution of such process.

Advantageously, the total number of pressing tests, which is considerably higher than 15 in a conventional process, may be reduced up to about three or four pressing tests.

BRIEF DESCRIPTION OF THE DRAWINGS

An example of an embodiment is described below in more detail with reference to the drawing. There is shown in.

DETAILED DESCRIPTION OF CERTAIN INVENTIVE EMBODIMENTS

Figure 3:
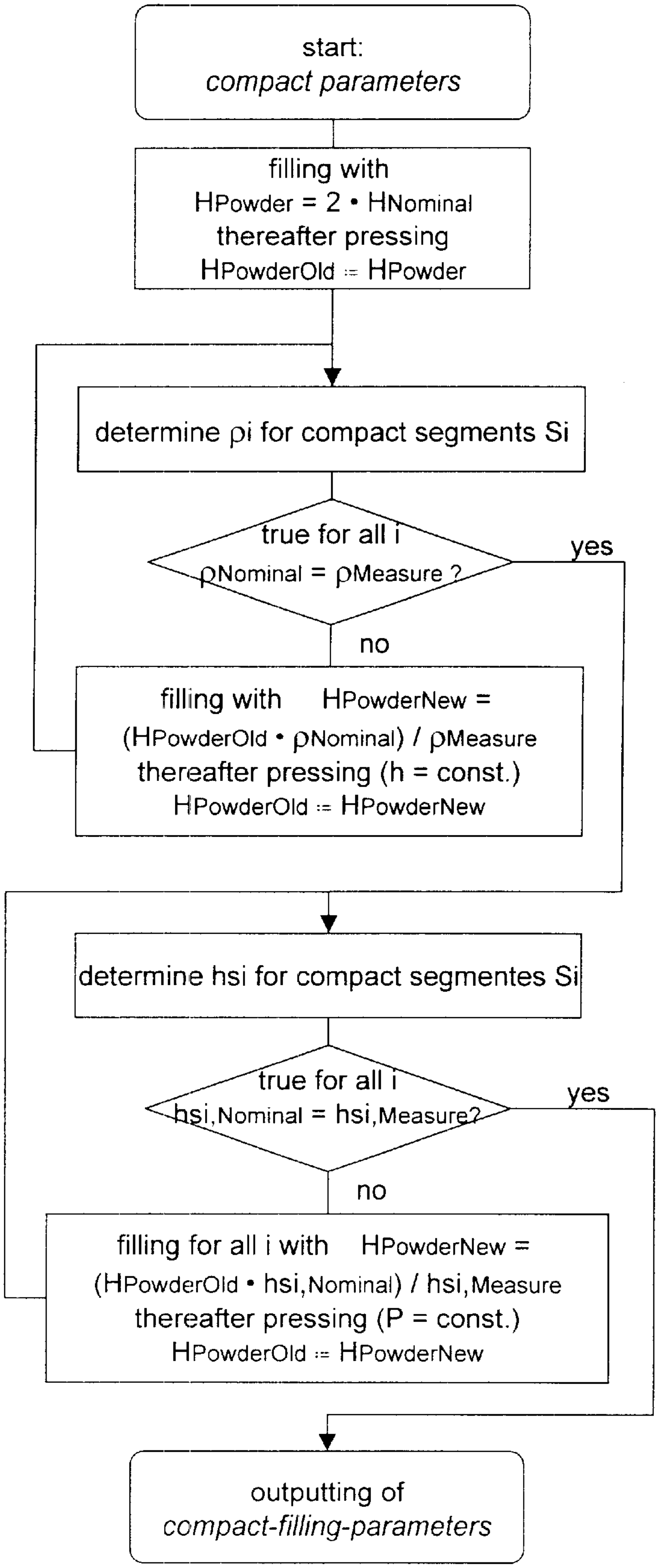

As can be seen from the flow chart of FIG. 3, a preferred process for determining the pressing parameters for the pressing of compacts of complex shape, in particular ceramic compacts from preferably basic granulate or powder material comprises two process sections. In a first process section essentially only the density of the individual segments is optimized by removing or adding powder, whereas setting of the height is neglected. It is then in a second step that, upon having run-in the nominal or target densities, setting of the desired heights of the individual sections is carried out.

If the parameters has to be carried out for a new compact 9 or a compact 9 to be produced on a new press, powder will be filled into the pressing mould 1 before applying the pressing punches 2, 6–8 to a powder height $H_{Powder}$ which is about double the height of the aimed nominal height $H_{Nominal}$ of the compact segments S1–S3. Then the pressing punches 2, 6–8 are applied and the filled-in powder is compacted. For an automated algorithm, there will be allocated for each segment i a variable for describing the height of the powder level $H_{PowderOld}$ filled-in last by means of the value of the preceding powder height $H_{Powder}$ before pressing.

After pressing, there will be determined the density ρi for the individual segments of the compact Si with i=1–3 here.

In a next step, the measured density value $p_{Measure}$ is compared with the nominal value for the density $p_{Nominal}$. If the measured value for the density $p_{Measure}$ and the nominal value for the density $p_{Nominal}$ deviate from each other for one or all segments Si, the pressing mould will be filled with powder again. Hereby there will be determined for defining the new powder height $H_{PowderNew}$ the product of the old powder height $H_{PowderOld}$ times the quotient of the nominal density value $p_{Nominal}$ and the measured density value $p_{Measure}$ for the individual segments i. Having filled-in the powder, this will be compacted again, whereby the individual pressing punches 2, 6–8 will be moved each to the previous height $h_{OB}$, h1–h3, so that the individual height values $h_{OB}$, h1–h3 are kept constant on the press. The height values on the compact will still change as a rule. For an automated algorithm, the variable for the old powder level $H_{PowderOld}$ now will be allocated by powder level used now $H_{PowderNew}$. Then the process goes back to determining the density values ρi for the compact segments Si.

As soon as it is found in the interrogation that the nominal density values $p_{Nominal}$ are identical with or deviate only within acceptable tolerances from the measured density values $p_{Measure}$, the process proceeds to the next process step. First there will be determined the individual heights hsi for the individual segments Si of the compact. If these measured height values $hsi,_{Measure}$ for the compact segments Si differ from the nominal height values $hsi,_{Nominal}$, the pressing mould will be filled with powder again in order to carry out another pressing test. This time, the new powder height $H_{PowderNew}$ is determined as the product of the old powder height $H_{PowerOld}$, used last time, times the quotient of the nominal height $hsi,_{Nominal}$ and the measured height $hsi,_{Measure}$ for the individual segments Si. Then the filled-in powder will be pressed at constant pressing pressure, respectively constant pressing force, as compared to the last pressing step. For an automated process, the variable for the powder height used last $H_{PowferOld}$ will be allocated newly by height value used last $H_{PowderNew}$. Then the process goes back to determining the individual heights hsi for the compact segments Si.

If comparison of the nominal heights $hsi,_{Nominal}$ and the measured heights $hsi,_{Measure}$ shows that they are identical for all compact segments Si or deviate within acceptable tolerance limits, then the required pressing parameters have been determined and the process can be terminated.

In first tests, the total number of pressing tests, which as a rule was considerably higher than 15, could be reduced to 3 to 4 pressing tests. In the proposed process, use is made of the fact that, after the first pressing tests for determining the densities $\rho$1–$\rho$3 of the individual segments, the whole press, including the segment punches 6–8 and the main punch 2, is in a balanced deflected condition. Having achieved the target densities for the individual segment heights, the heights of the individual segments of the part can be calculated according to the second formula and be set independently and without effect on each other. As a rule, only one single step is required for calculating all heights of the part, if the densities of the individual segments have been determined and run-in before. Ideally it should be possible, with corresponding knowledge of the parameters of certain powders to be pressed and of parameters regarding the behavior of the individual elements of the press, to carry out determination of the pressing parameters in an even better optimized way than with the tests carried out so far.

Figure 1:
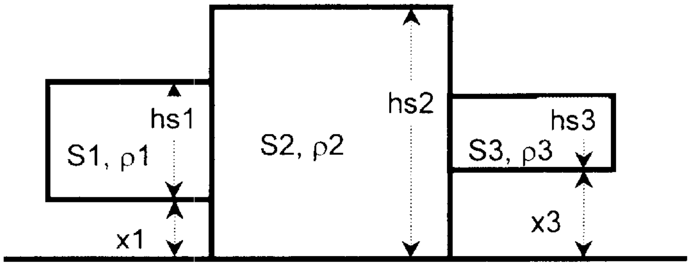
Fig. 1 (prior art)
FIG. 1 a compact of complex shape comprising several segments of different height.
Figure 2A:
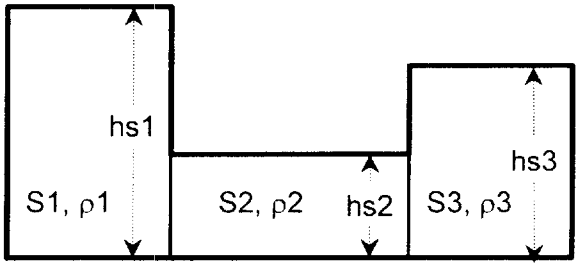
Fig. 2A (prior art)
FIG. 2A an example of a compact of more simple shape comprising several segments of different height.
Figure 2B:
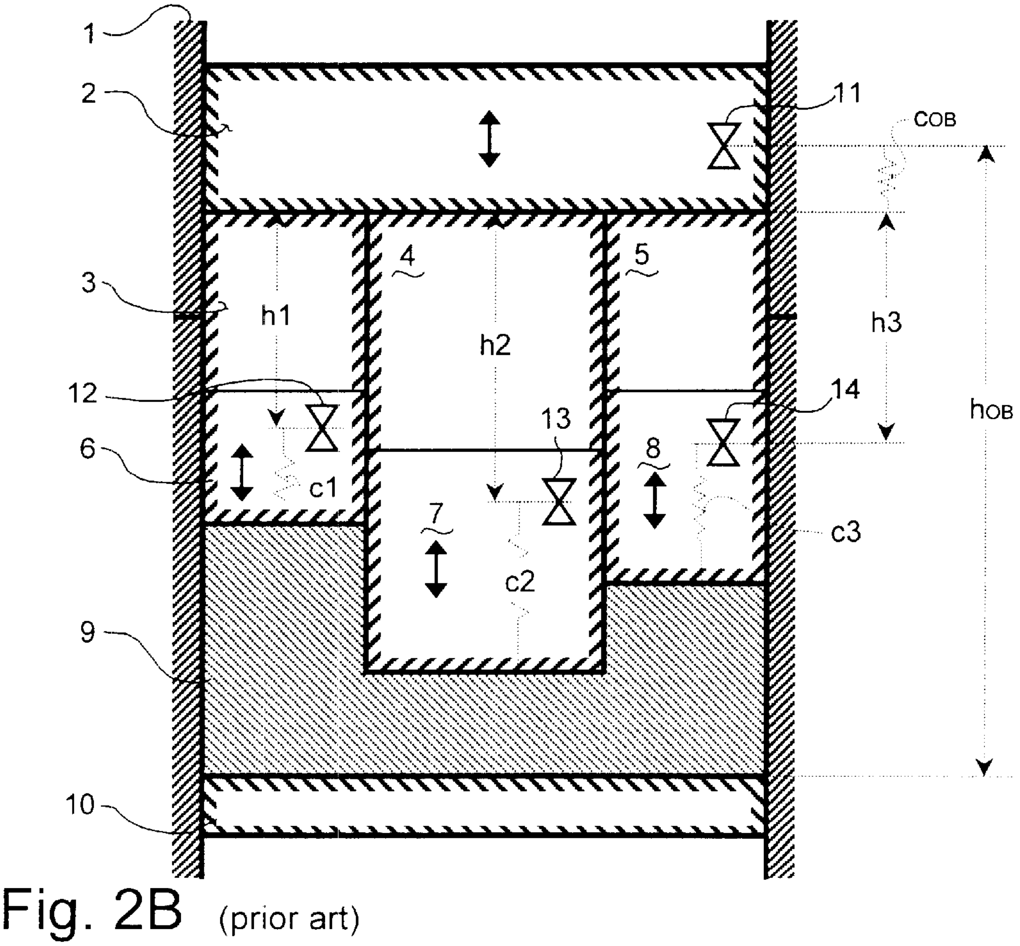
Fig. 2B (prior art)
FIG. 2B a pressing arrangement for pressing a basic powder material to form a compact, and FIG. 3 a flow-chart for a pressing process according to the preferred embodiment.

Whereas in FIG. 2B, for simplification of the explanation, there is shown a press with pressing punches only above the pressing mould, usual presses for producing compacts of complex shape are provided with punch arrangements also below the pressing mould. The proposed process can be applied, of course, also with such pressing arrangements.

The process can be automated in part or completely in a correspondingly equipped device with a pressing device with a number of pressing punches (2, 6–8) movable forward and backward in a pressing direction, travel measuring devices (11–14) for measuring the movements of the punches (2, 6–8), a device for determining the parameters of the compact for determining the density and/or height parameters ($\rho$1–$\rho$3, hs1–hs3) of a compact (9) and a calculation device for calculating the filling height of the pressing material for always the next pressing test.

What is claimed is:

1. A process for determining pressing parameters for pressing compacts from a basic material, comprising:

pressing a basic material of a first height to form a first test compact;

measuring a density of the first test compact;

if the density of the first test compact is outside a predetermined tolerance value of a nominal density, pressing a basic material of a second adjusted height to form a second test compact;

repeating said density measuring and pressing one or more additional times if the second or subsequent test compact density is outside said predetermined tolerance value of a nominal density to produce a test compact within said tolerance value of said nominal density;

measuring a height of the test compact that has a density within the tolerance value;

if a nominal height and the determined height do not coincide within a predetermined tolerance value of the nominal height, pressing a basic material of another adjusted height to form an additional test compact; and repeating said height measuring and pressing one or more additional times if the additional or subsequent test compact height is outside said predetermined tolerance value of a nominal height to produce a test compact within said tolerance value of said nominal height.

2. The process according to claim 1, wherein the second adjusted height is determined by a product of; said first height of basic material and a quotient of the nominal density and the measured density, and wherein said second test compact is formed by pressing again at pressing height which is substantially the same as a previous pressing height.

3. The process according to claim 1, wherein the another adjusted height is determined by a product of a height of previously applied basic material and a quotient of the nominal height and the determined height, and wherein said additional test compact is formed by pressing again at a pressing force which is substantially the same as a previous pressing force.

4. The process according to claim 1, wherein said test compacts comprise separate segments having different nominal densities and nominal heights, and wherein said measurements, are carried out independently for each segment.

* * * * *